United States Patent [19]

Hall et al.

[11] Patent Number: 5,600,222
[45] Date of Patent: Feb. 4, 1997

[54] THERMAL MANAGEMENT USING A HYBRID SPIRAL/HELICAL WINDING GEOMETRY

[75] Inventors: John T. Hall, Woodland Hills; Ray G. Radys, Santa Monica; George R. Woody, Redondo Beach, all of Calif.

[73] Assignee: Delco Electronics Corporation, Kokomo, Ind.

[21] Appl. No.: 348,665

[22] Filed: Dec. 2, 1994

Related U.S. Application Data

[63] Continuation-in-part of Ser. No. 140,954, Oct. 25, 1993, Pat. No. 5,434,493.

[51] Int. Cl.$^6$ ........................................... H02J 7/00
[52] U.S. Cl. ........................................ 320/2; 336/DIG. 2
[58] Field of Search ................... 320/2, 39; 336/DIG. 2, 336/225–232

[56] References Cited

U.S. PATENT DOCUMENTS

| | | | |
|---|---|---|---|
| 4,656,412 | 4/1987 | McLyman | 320/39 |
| 5,341,281 | 8/1994 | Skibinski | 363/39 |
| 5,434,493 | 7/1995 | Woody et al. | 320/2 |
| 5,463,303 | 10/1995 | Hall et al. | 320/2 |

OTHER PUBLICATIONS

PESC '93 Record IEEE Power Electronics Specialists Conference (93CH3293–8) Converter Selection for Electric Vehicle Charger Systems With a High–Frequency High–Power Link Publication Date: Jun. 2, 1993.

Primary Examiner—Peter S. Wong
Assistant Examiner—K. Shin
Attorney, Agent, or Firm—Mark A. Navarre

[57] ABSTRACT

An inductive battery charging system comprising a charge probe and a charge port that employs multi-turn spiral and helical windings in the charge probe to provide improved thermal management of the power produced by the charging system. The thermal management provided by the multi-turn windings of the present invention improves the power handling capacity of the system and reduces AC proximity losses. Numerous flat helical coil and spiral transformer windings are disclosed that provide for differing thermal management schemes. The present invention may be used to increase the inductive charging capacity of electric vehicle propulsion batteries to on the order of 120 KW. The present invention may be used with almost any transformer or inductor that uses foil windings.

4 Claims, 5 Drawing Sheets

5,600,222

THERMAL MANAGEMENT USING A HYBRID SPIRAL/HELICAL WINDING GEOMETRY

This application is a continuation-in-part of U.S. Ser. No. 08/140,954, filed Oct. 25, 1993, now U.S. Pat. No. 5,434, 493, issued Jul. 18, 1995.

BACKGROUND

The present invention relates to inductive battery charging systems, and more particularly, to the use of spiral/helical foil windings in an inductive charging probe that moves the outer foil windings of the probe closer to a heat sink, thereby improving thermal management.

The assignee of the present invention designs, develops and manufactures inductive battery charging systems for use in charging the propulsion batteries of electric vehicles. The inductive charging system is employed to charge the propulsion batteries of an electric vehicle. A charge station is coupled to a power source and has an extendable charging cord that is coupled to a charge probe. The charge probe comprises a primary core and a primary winding of a transformer and is inserted into a charge port disposed in the electric vehicle that comprises secondary core and secondary windings of the transformer. The charge port and the charge probe form an inductive coupler. The charge port is coupled by way of a charge controller that interfaces to the propulsion batteries of the electric vehicle to supply power thereto.

The closest prior art relating to the present invention is the use of a helical foil stack of windings in a planer transformer. The disadvantages of this type of transformer are that as the foil stack of windings grows in thickness, the losses in each foil windings increase because of the AC loss proximity effect.

There is a desire to produce inductive chargers that permits inductive coupling at very high charge rates or power charging levels, such as on the order of 120 KW or more. However, it has been found that, at 50 KW power charging levels and higher, overheating at the interface between the inductive charger and electric vehicle becomes a limiting factor. Providing for improved thermal management of the inductive coupler is necessary to help overcome this limitation if the power transfer goal is to be met.

Therefore, it is an objective of the present invention to provide for an inductive charging system that employs spiral/helical foil windings in an inductive charging probe that moves the outer foil windings of the probe closer to a heat sink, thereby improving the power handling capacity and thermal management of the system.

SUMMARY OF THE INVENTION

In order to meet the above and other objectives, the present invention is an inductive battery charging system that employs spiral/helical foil windings in an inductive charging probe that moves the outer-foil windings of the probe closer to a heat sink. Use of the spiral/helical foil windings improves the power handling capacity and thermal management of the inductive battery charging system.

More specifically, the present invention may be employed in an inductive charging system for use in charging propulsion batteries of an electric vehicle. The inductive charging system comprises a power source and a charge station coupled to the power source. A charge probe that comprises a primary core and a primary winding of a transformer is coupled to the charge station by means of an extendable charging cable. A charge port is disposed in the electric vehicle that comprises a secondary core and secondary windings of the transformer. A charge controller is coupled between the charge port and the batteries of the electric vehicle for coupling power to the batteries. The improvement provided by the present invention comprises a primary winding having a predetermined number of turns stacked in a predetermined number of layers, wherein at least one of the turns comprises a spiral multi-turn winding such that the number of layers is less than the number of turns.

Removing heat from transformer windings is difficult because the winding wires or foils are insulated. In the present invention, spiral/helical foil windings are used to move the outer foil conductors closer to the heat sink to improve thermal management and provide for higher power handling capacity. The present invention addresses the need to raise inductive power charging capacity of electric vehicle propulsion batteries to on the order of 120 KW and beyond.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1b shows the primary components of the inductive charging system of FIG. 1a;

FIG. 3b shows a hybrid two-spiral/two-helix six-turn transformer winding in accordance with the present invention that replaces the conventional four-layer helical foil transformer winding of FIG. 3a;

DETAILED DESCRIPTION

Figure 1A:
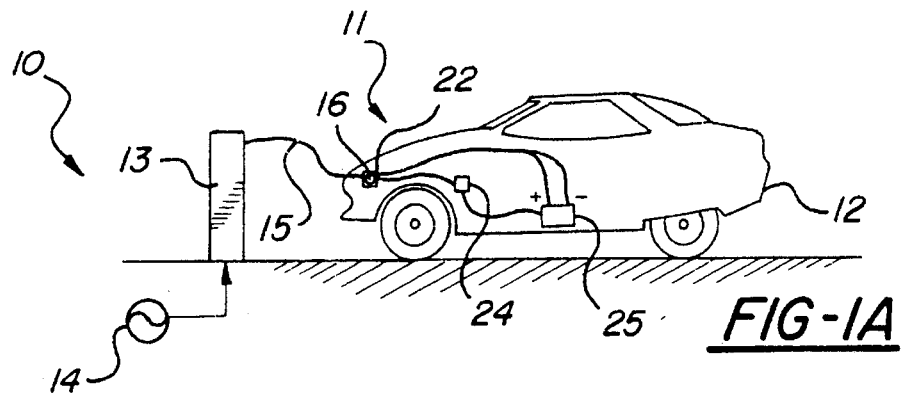
FIG. 1a shows an electric vehicle inductive charging system employing novel spiral/helical foil windings in accordance with the principles of the present invention.
Figure 1B:
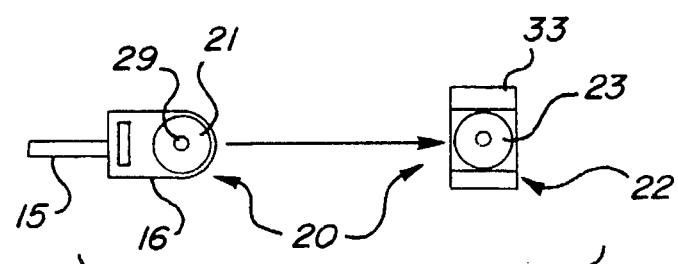
Figure 1C:
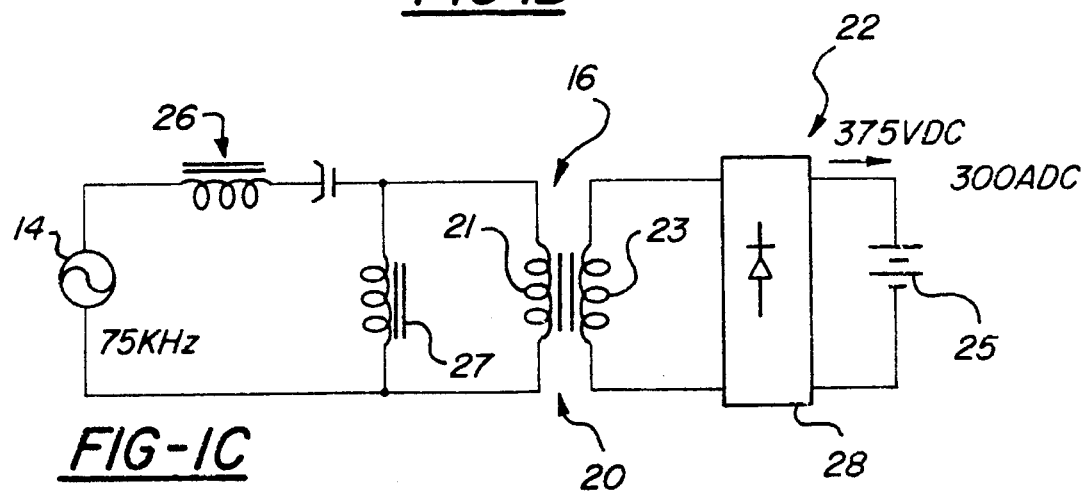
FIG. 1c is an electrical diagrams corresponding to the components shown in the inductive charging system of FIG. 1b.
Figure 2:
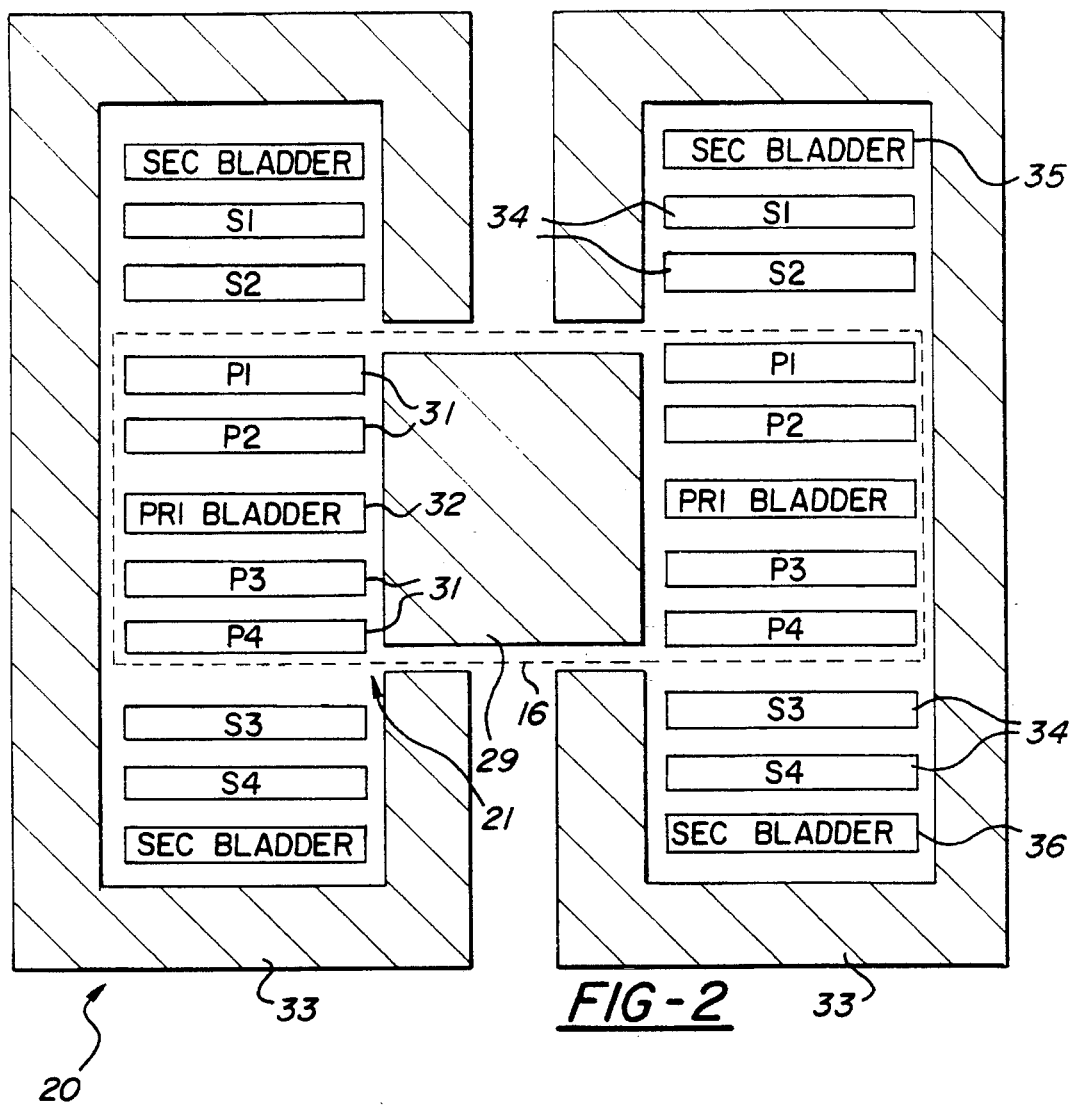
FIG. 2 is a enlarged cross sectional view of the transformer of the inductive charging system of FIGS. 1b and 1c employing the spiral/helical foil windings of the present invention.

Referring to the drawing figure, FIG. 1a illustrates an electric vehicle inductive charging system 10 employing an inductive charger 11 comprising employing novel spiral/helical foil windings in accordance with the principles of the present invention. FIG. 1a shows the interconnection of the inductive charger 11 to an electric vehicle 12. FIG. 1c is an electrical diagram corresponding to the components shown in the inductive charging system 10 of FIG. 1b. FIG. 2 is a enlarged cross sectional view of a transformer 20 of the inductive charging system 10 of FIGS. 1b and 1c employing spiral/helical foil windings in accordance with the principles of the present invention.

Referring to FIGS. 1a–c and 2, a charge station 13 is coupled to a power source 14 and has an extendable charging cable 15 that is coupled to a charge probe 16. The charge probe 16 comprises a primary core 29 and a primary winding 21 of a transformer 20 and is inserted into a charge port 22 disposed in an electric vehicle 12. The charge port 22 comprises a secondary core 33 and secondary windings 23 of the transformer 20. The charge port 22 and the charge probe 16 form an inductive coupler. The charge port 22 is coupled by way of a charge controller 24 to propulsion batteries 25 of the electric vehicle 12.

Low frequency AC provided by the power source 14 is converted to medium frequency AC (75 KHZ) and then passed through the inductive coupler. The output of the secondary windings 23 of the inductive coupler is rectified and filtered in the charge controller 24 and is used to charge the propulsion batteries 25 of the electric vehicle 12. FIG. 1b shows the two portions of the inductive coupler, namely the charge probe 16 and the charge port 22. The charge probe 16 corresponds to the primary core 29 and primary winding 21 of the transformer 20 while the charge port 22 contains the secondary transformer cores 33, typically E-shaped cores, and the secondary windings 23.

FIG. 1c shows a simplified electrical schematic of the interface between the charger 11 and the electric vehicle 12. FIG. 1c shows that the charge station 13 produces a 75 KHz output that is passed through a resonant tank circuit 26 and inductor 27 and is coupled to the charge probe 16 which comprises the primary winding 21 of the transformer 20. The charge port 22 comprises the secondary windings 23 of the transformer 20 and is coupled through a rectifier 28 which produces a 375 volt signal at 300 amps which is coupled to the propulsion batteries 25 of the electric vehicle 12.

Referring to FIG. 2, the probe 16 is comprised of the primary core 29, the primary winding 21 which includes four-turns 31 (P1 to P4), and a primary bladder 32 or heat sink 32. The probe 16 may use a 6/8 turn primary (P1 to P6/P8) and the primary bladder 32 or heat sink 32. The charge port 22 is comprised of of two E-shaped secondary cores 33, the secondary winding 23 comprising four turns 34 (S1 to S4), and upper and lower secondary bladders 35, 36. All of the turns 31, 34 of the windings 21, 23 of the transformer 20 are made from flat spiral or helical foil. The bladders 32, 35, 36 comprise heat sinks 32 that are heat conducting and that are typically comprised of copper, for example, that are inserted between or adjacent turns 31, 34 of the windings 21, 23 and that remove heat from windings 21, 23 of the transformer 20.

Figure 3A:
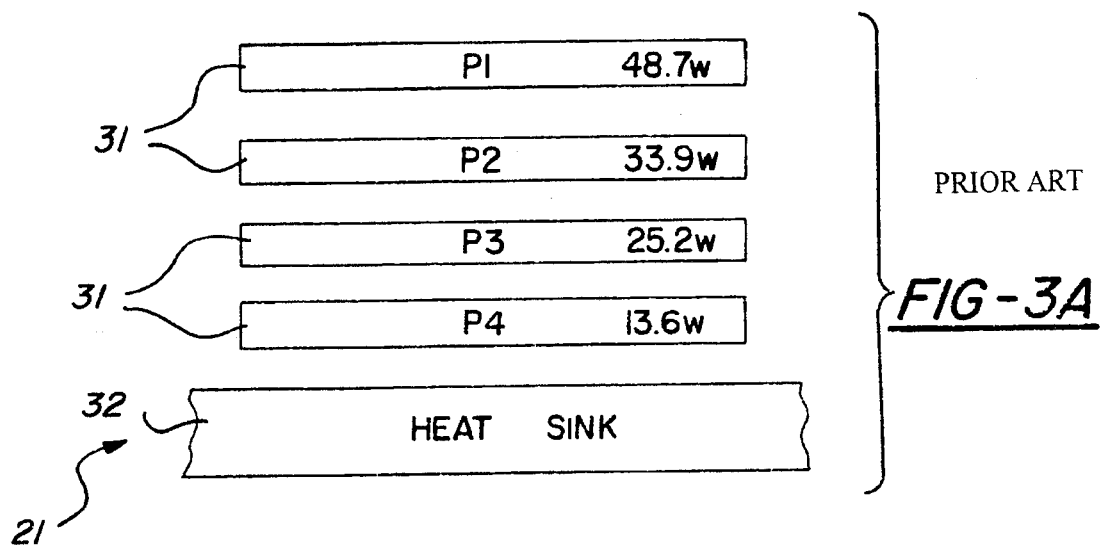
FIG. 3a shows a conventional four-layer helical foil transformer winding.

FIG. 3a shows a conventional four-layer helical foil transformer winding 21, such as is employed in a conventional primary winding 21 for use in the transformer 20. The computed losses for this transformer winding 21 are 121.4 watts for an input current of 333 amps RMS at 75 KHz.

Figure 3B:
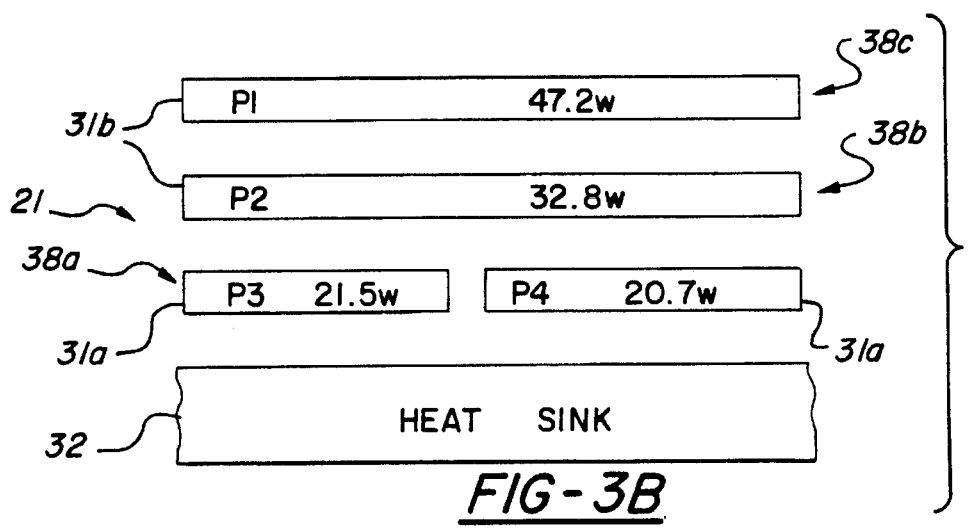

FIG. 3b shows a hybrid two-spiral/two-helix turn transformer winding 21 in accordance with the present invention for use in the transformer 20 that replaces the conventional four-layer helical foil transformer winding 21 of FIG. 3a. The transformer winding 21 comprises two spiral turns 31 a disposed in a single layer 38a and two helical turns 31b disposed in second and third stacked layers 38b, 38c. The computed losses for this transformer winding 21 are 122.2 watts for an input current of 333 amps RMS at 75 KHZ. The total AC losses increase by about 0.8 W but the losses in the top foil turn 31b decrease by 1.5 W. Also, the farthest out hybrid turn 31b of the winding 21 is disposed closer to the bladder 32, or heat sink 32, which makes thermal management easier.

Thus, as can be seen by means of a comparison of FIGS. 3a and 3b, the improvement provided by the present invention comprises a primary winding 21 having a predetermined number of turns 31 stacked in a predetermined number of layers 38, wherein at least one of the turns 31 comprises a spiral multi-turn winding 31a so that the number of layers 38 is less than the number of turns 21.

Figure 4A:
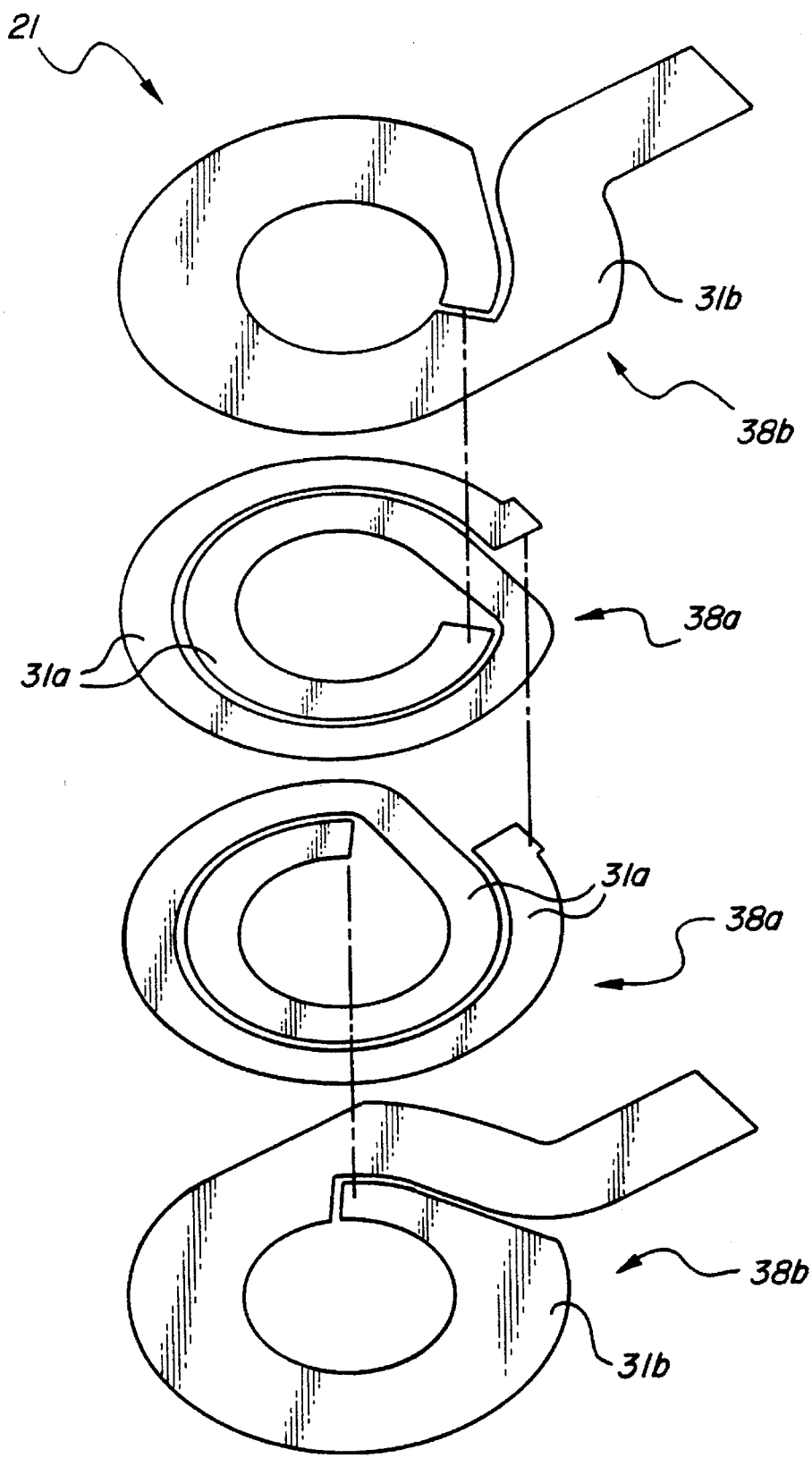
FIG. 4a shows an exploded view of the six-turn transformer winding of FIG. 3b.

FIG. 4a shows an exploded view of the six-turn transformer winding 21 of FIG. 3b. The vertical dashed lines in FIG. 4a indicate weld points between the respective turn 31a, 31b of the six-turn transformer winding 21. This embodiment reduces the number of layers 38 from six to four.

Figure 4B:
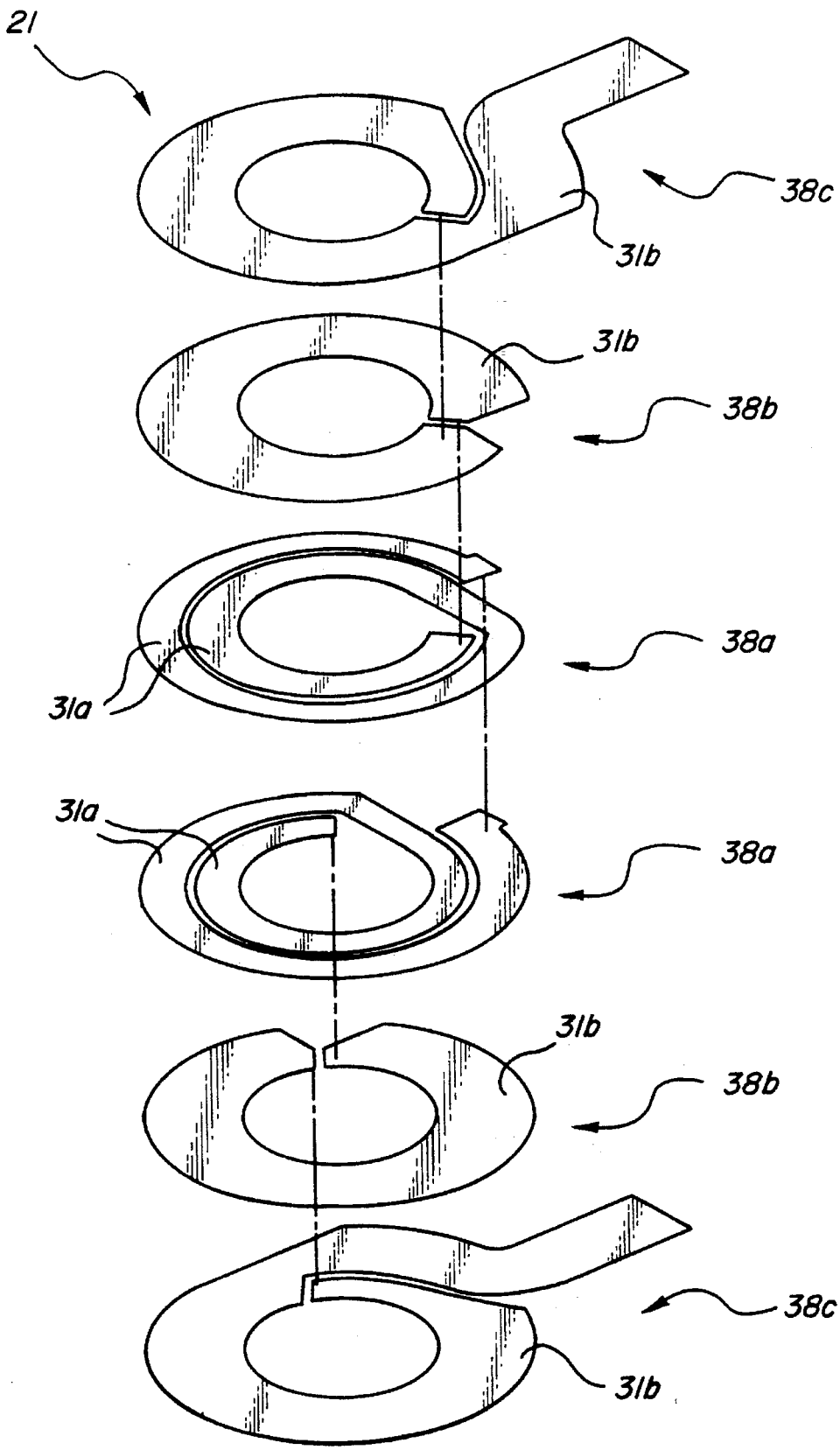
FIG. 4b shows an exploded view of an eight-turn transformer winding in accordance with the present invention.

FIG. 4b shows an exploded view of an eight-turn transformer winding 21 in accordance with the present invention. The vertical dashed lines in FIG. 4b again indicate weld points between the respective turns 31a, 31b of the eight-turn transformer winding 21. This embodiment reduces the number of layers 38 from eight to six.

The present invention is not limited to the above described designs. Other designs which are possible are two-spiral, three-spiral, two-spiral/one-helix, three-spiral/one-helix, two-spiral/two-spiral, and four-spiral designs. These are described with references to FIGS. 5a–c and 6a–c.

Figure 5A:
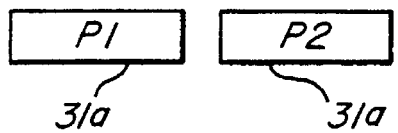
FIG. 5a shows a cross sectional view of a two-spiral transformer winding for use in the six-turn transformer winding of FIG. 3b.
Figure 5B:
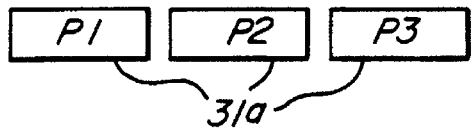
FIG. 5b shows a cross sectional view of a three-spiral transformer winding for use in the six-turn transformer winding of FIG. 3b.
Figure 5C:
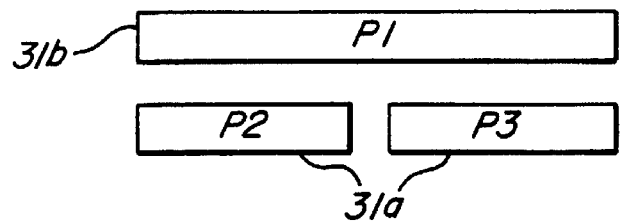
FIG. 5c shows a cross sectional view of a two-spiral/one-helix transformer winding for use in the six-turn transformer winding of FIG. 3b.

FIG. 5a shows a cross sectional view of a hybrid two-spiral transformer winding in accordance with the present invention for use in the transformer 20. FIG. 5b shows a cross sectional view of a hybrid three-spiral transformer winding in accordance with the present invention for use in the transformer 20. FIG. 5c shows a cross sectional view of a hybrid two-spiral/one-helix transformer winding in accordance with the present invention for use in the transformer 20.

Figure 6A:
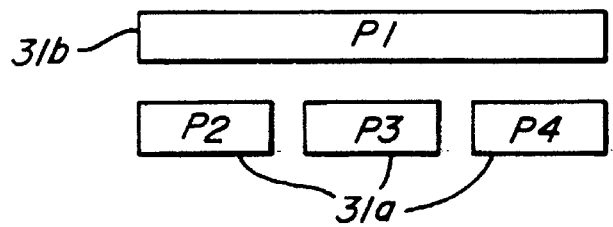
FIG. 6a shows a cross sectional view of a three-spiral/one-helix transformer winding for use in the eight-turn transformer of FIG. 4b.
Figure 6B:
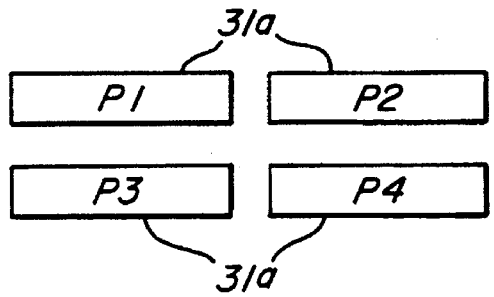
FIG. 6b shows a cross sectional view of a two-spiral/two-spiral transformer winding for use in the eight-turn transformer of FIG. 4b.
Figure 6C:
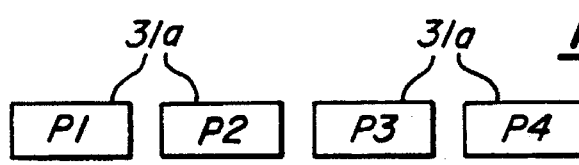
FIG. 6c shows a cross sectional view of a four-spiral transformer winding for use in the eight-turn transformer of FIG. 4b.

FIG. 6a shows a cross sectional view of a hybrid three-spiral/one-helix transformer winding in accordance with the present invention for use in the transformer 20. FIG. 6b shows a cross sectional view of a hybrid two-spiral/two-spiral transformer winding in accordance with the present invention for use in the transformer 20. FIG. 6c. shows a cross sectional view of a hybrid four-spiral transformer winding in accordance with the present invention for use in the transformer 20.

The various winding designs illustrated in FIGS. 5a–c and 6a–c represent different possible configurations of the spiral and helical turns 31a, 31b of the primary winding 21. Each of the designs shown in FIGS. 5a–c and 6a–c, although they use the spiral turn design of the present invention, provide for differing amounts of thermal dissipation.

Thus, there has been disclosed a new and improved inductive charging system that employs spiral/helical foil windings in an inductive charging probe that moves the outer foil windings of the probe closer to a heat sink, thereby improving the power handling capacity and thermal management of the system. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An inductive charging system for use in charging batteries of an electric vehicle, wherein said inductive charging system comprises a power source, a charge station coupled to the power source, a charge probe that comprises a primary core and a primary winding of a transformer coupled to the charge station by means of an extendable charging cable, a charge port disposed in the electric vehicle that comprises a secondary core and secondary windings of the transformer, and a charge controller coupled between the charge port and the batteries of the electric vehicle, wherein the improvement comprises:

a primary winding comprising a predetermined number of turns stacked in a predetermined number of layers and wherein at least one of the turns comprises a spiral multi-turn winding such that the number of layers is less than the number of turns.

2. The system 10 of claim 1 wherein the primary winding comprises a first layer comprising two spiral turns that form the multi-turn winding and second and third layers each comprising helical turns.

3. An inductive charging system for use in charging batteries of an electric vehicle, wherein said inductive charging system comprises a power source, a charge station coupled to the power source, a charge probe that comprises a primary core and a primary winding of a transformer coupled to the charge cable by means of an extendable charging cable, a charge port disposed in the electric vehicle that comprises a secondary core and secondary windings of the transformer, and a charge controller coupled between the charge port and the batteries of the electric vehicle, wherein the improvement comprises:

a charge probe that comprises a primary core and a primary winding of a transformer, and a heat sink, and wherein the primary winding comprises a predetermined number of turns stacked in a predetermined number of layers and wherein at least one of the turns comprises a spiral multi-turn winding such that the number of layers is less than the number of turns.

4. The system of claim 3 wherein the primary winding comprises a first layer comprising two spiral turns that form the multi-turn winding and second and third layers each comprising helical turns.

* * * * *